Feb. 15, 1966  A. J. WORMGOOR  3,234,914
FEEDER WITH COVERING DEVICE
Filed Oct. 5, 1964
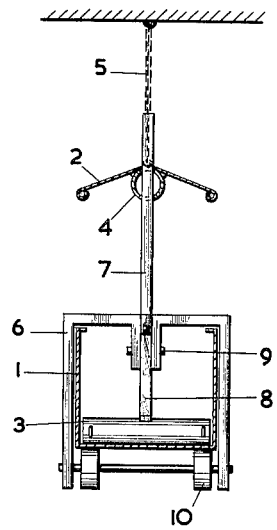
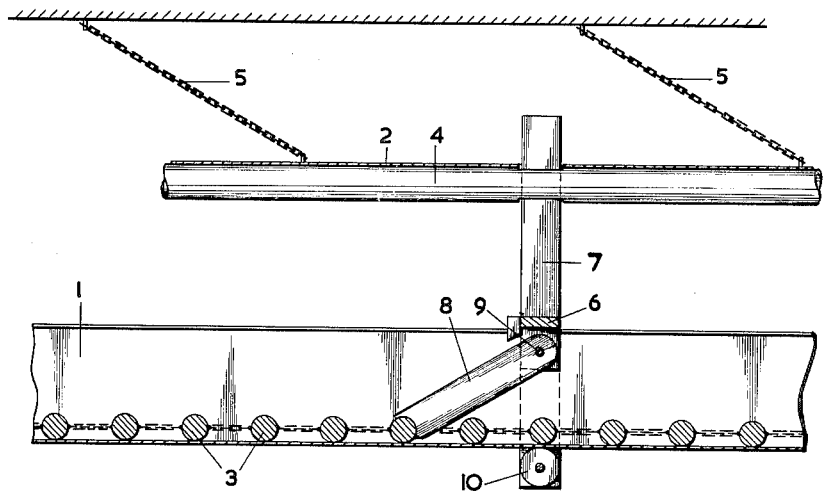
INVENTOR
Arend J. Wormgoor
BY
ATTORNEY United States Patent Office 3,234,914
Patented Feb. 15, 1966

3,234,914
FEEDER WITH COVERING DEVICE
Arend Jan Wormgoor, Diepenheim, Netherlands, assignor to Antonius Zweegers, Geldrop, Netherlands
Filed Oct. 5, 1964, Ser. No. 401,309
6 Claims. (Cl. 119—63)

It is known that the feeding of poultry freely running about in a poultry house, such as hens and chickens, takes place with aid of feeders, which usually consist of conveying troughs placed in the house, in which troughs a conveyor chain is moved by a driving mechanism. The feed is poured into a reservoir mounted above the trough and is distributed from that point by the travelling endless conveyor chain over the whole length of the trough. These conveying troughs are open at the top, which involves the drawback that when for some time past no feed has been present in the trough and the chain starts moving, all of the fowls present in the house rush towards the point where the first feed enters the trough. The strongest fowls will then be able to take in the best feed, while the weaker ones are also swept off their feet. The invention removes this drawback because during the filling operation the feeding trough is shut off at the top over its whole length, and after the filling operation is opened simultaneously over its whole length, so that all the fowls, no matter where they are near the feeding trough, can start at the same time to take in feed. This system is of particular advantage when the feed is to be rationed and accordingly the feeding trough is repeatedly left without feed for a considerable time.

The drawing shows an embodiment of the invention.

FIG. 1 is a cross-section and FIG. 2 is a longitudinal section of the feeding trough with the cover in the opened position.

The numeral 1 designates the feeding trough, 2 is the cover, which, when lowered, is adapted to shut off the trough, 3 are the parts of the conveyor chain, which conveys the feed through the trough. When the trough is being filled, the chain travels from right to left. The cover 2 is supported by a tube 4, which is suspended e.g. by cords or chains 5, which do not hang vertically when the trough is opened. Surrounding the trough are braces 6, on which supports 7 are firmly fastened, along which the tube 4 is adapted to move up and down through openings therein. When rollers 10 are fitted at the point where the brace 6 rests against the underside of the trough it will slide easily along the trough. The closing and opening of the cover is effected as follows. When, as stated, during the filling operation the chain travels from right to left, the support 7 can move along with it in this direction and the cover 2 will be lowered on to the trough 1 by its own weight. As soon as the cover 2 rests on the trough 1, the pawl 8 can pivot about the pin 9 in support 7 while the chain 3 is moving along and the trough will be filled with feed over its whole length. When the fowls are subsequently to be enabled to take in feed, the chain is made to travel in the opposite direction (from left to right). Because pawl 8 rests against chain 3, support 7 is then also moved to the right and the cover is lifted off the trough.

What I claim is:
1. A feeding device for poultry comprising a horizontally disposed elongated open topped pan having a horizontal separable cover extending along the length of the pan, means for supporting the cover including a pair of longitudinally spaced parallel connector elements for suspending the cover above the pan, said connector elements flexibly connected at their upper ends with a fixed support and their lower ends flexibly connected with the cover, whereby said cover will be lowered to cover the pan when longitudinally moved in one direction and raised to open the pan when moved in the opposite direction, an endless chain conveyor means in said pan extending along the length thereof and actuating means longitudinally slidably mounted on said pan, said actuating means being in sliding engagement with the cover and including one-way engagement means connected with said chain conveyor means, whereby movement of the conveyor means in one direction will lower the cover and movement of the conveyor in the opposite direction will raise the cover.

2. The invention as defined in claim 1, wherein said actuating means includes a vertical element slidably received in an opening provided in said cover for relative vertical slidable engagement.

3. The invention as defined in claim 2, wherein said actuating means includes a pivotally mounted pawl element for one-way engagement with said endless chain conveyor means.

4. A feeding apparatus for poultry comprising a horizontally elongated trough having an open top along its length, an endless chain conveyor disposed in the trough along its entire length for distributing feed admitted to the trough at one point along the entire length of the trough when moved in one direction, a cover coextensive in length with the trough, means to support the cover above the trough, said support means including a member engaging with the endless chain conveyor for lowering the cover on the trough when moving in said one direction and for raising the cover above the trough when moved in the opposite direction.

5. A feeding device for poultry comprising an elongated horizontal trough open at the top, cover means for closing the top of the trough, conveyor means disposed along the length of the trough for distributing feed admitted at one point along the length of the trough when the conveyor means is moved in one direction, actuating means for the cover means, said actuating means including support means for movably mounting the cover means above the top of the trough and a member slidably engaging the cover and the conveyor for moving said cover means to a closed position when the conveyor means is moved in said one direction and for moving the cover means to an open position when the conveyor means is moved in the opposite direction.

6. A feeding trough for poultry comprising an elongated horizontally disposed container means open at the top, cover means for closing the top of said container, means for movably supporting the cover means above the top of the container means, conveyor means disposed in the lower portion of the container means and extending along the entire length thereof, whereby feed admitted to the container means at one point may be distributed along the length of the container means, said cover means being movable between open and closed positions, and the closure means including a member slidably engaging the conveyor and the cover for moving the cover means to the closed position when feed is admitted at said one point and for moving the cover means to the open position after feed has been admitted.

References Cited by the Examiner
UNITED STATES PATENTS

| 1,553,746 | 9/1925 | Bulla | 119—63 |
| 2,782,761 | 2/1957 | Martin et al. | 119—52 |

SAMUEL KOREN, Primary Examiner.
HUGH R. CHAMBLEE, Examiner.